United States Patent
Wang et al.

(10) Patent No.: US 11,860,385 B2
(45) Date of Patent: Jan. 2, 2024

(54) TUNABLE LIQUID CRYSTAL GRATING-BASED HOLOGRAPHIC TRUE 3D DISPLAY SYSTEM AND METHOD

(71) Applicant: BEIHANG UNIVERSITY, Beijing (CN)

(72) Inventors: Di Wang, Beijing (CN); Qionghua Wang, Beijing (CN); Chao Liu, Beijing (CN); Fan Chu, Beijing (CN); Yilong Li, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 269 days.

(21) Appl. No.: 17/604,872

(22) PCT Filed: Jan. 5, 2021

(86) PCT No.: PCT/CN2021/070320
§ 371 (c)(1),
(2) Date: Oct. 19, 2021

(87) PCT Pub. No.: WO2022/126804
PCT Pub. Date: Jun. 23, 2022

(65) Prior Publication Data
US 2022/0214559 A1  Jul. 7, 2022

(51) Int. Cl.
*G02B 30/00* (2020.01)
*G02F 1/29* (2006.01)

(52) U.S. Cl.
CPC ............. *G02B 30/00* (2020.01); *G02F 1/292* (2013.01)

(58) Field of Classification Search
CPC .......... G02B 5/32; G02B 30/31; G02B 30/26; G02F 1/292; G03H 2001/0224;
(Continued)

(56) References Cited

U.S. PATENT DOCUMENTS

2006/0139711 A1* 6/2006 Leister ................. G03H 1/0005
359/9
2012/0008482 A1* 1/2012 Bablumyan .......... G03H 1/0011
(Continued)

FOREIGN PATENT DOCUMENTS

CN  105824128 A  8/2016
CN  107356194 A  11/2017
(Continued)

OTHER PUBLICATIONS

Chinese First search priority document cited in Application No. 2020114795419, 2 pgs.
(Continued)

*Primary Examiner* — Jonathan Y Jung
(74) *Attorney, Agent, or Firm* — BEKIARES ELIEZER LLP

(57) ABSTRACT

A tunable-liquid-crystal-grating-based holographic true 3D display system comprises a laser, a filter, a beam expander, a semi-transparent semi-reflective mirror, a spatial light modulator, a lens I, a diaphragm, a tunable liquid crystal grating, a polaroid, a signal controller, a lens II and a receiving screen. The laser, the filter and the beam expander are used for generating collimated incident light. The spatial light modulator is loaded with a hologram of a 3D object. The diaphragm is positioned behind the lens I for eliminating a high-order diffracted light in the holographic true 3D display. The tunable liquid crystal grating is located on the back focal plane of the lens I and on the front focal plane of the lens II, and the signal controller is used for synchronously controlling the voltage of the tunable liquid crystal grating and the generation and loading of the hologram.

2 Claims, 4 Drawing Sheets

(58) Field of Classification Search
CPC ... G03H 2001/2207; G03H 2001/2297; G03H 2223/23; G03H 2225/22; G03H 2225/60; G03H 1/2294
See application file for complete search history.

(56) References Cited

U.S. PATENT DOCUMENTS

2012/0188619 A1* 7/2012 Song .................. G03H 1/2294
359/9
2016/0313556 A1 10/2016 Futterer
2020/0400953 A1* 12/2020 Hong ................ G02B 27/0172

FOREIGN PATENT DOCUMENTS

| CN | 108519729 A | 9/2018 |
|----|-------------|--------|
| CN | 108919503 A | 11/2018 |
| CN | 110058507 A | 7/2019 |
| CN | 111399356 A | 7/2020 |
| TW | 200921308 A | 5/2009 |
| WO | 2012062681 A | 5/2012 |

OTHER PUBLICATIONS

Chinese Supplemental search priority document cited in Application No. 2020114795419, 1 pgs.
International Search Report and Written Opinion dated Sep. 24, 2021 cited in Application No. PCT/CN2021/070320, 9 pgs.
Chinese Notification to Grant Patent cited in Application No. 2020114795419, 1 pg.
Chinese Office Action dated Jul. 30, 2021 cited in Application No. 202011479541.9, 3 pgs.

* cited by examiner

TUNABLE LIQUID CRYSTAL GRATING-BASED HOLOGRAPHIC TRUE 3D DISPLAY SYSTEM AND METHOD

CROSS-REFERENCES TO RELATED APPLICATIONS

The present application is a U.S. National Stage under 35 U.S.C. § 371 of International Application No. PCT/CN2021/070320, filed on Jan. 5, 2021, which claims the benefit of the Chinese Patent Application No. 202011479541.9, entitled "Tunable Liquid Crystal Grating-based Holographic true 3D display system and method", and filed on Dec. 14, 2020. The entire contents of each of these applications are incorporated herein by reference.

TECHNICAL FIELD

This application relates to holographic display technology, more particularly, to tunable liquid crystal grating-based holographic true 3D display system and method.

BACKGROUND ART

The holographic technology can provide a realistic stereoscopic display effect without wearing auxiliary equipment, and does not cause any discomfort or fatigue, thereby receiving wide attention. For holographic true 3D displaying, typically, the generation of holograms is generated by means of a computer, while the input light is modulated by a spatial light modulator to recreate a 3D scene. However, the viewing angle and size of the holographic reconstructed image are very small due to the influence of devices such as the spatial light modulator, and the viewing angle corresponding to the spatial light modulator with the pixel size of micron level on current market is only a few degrees, which seriously affects the viewing experience of people. Researchers of Chiba University in Japan proposed a method of performing planar arrangement on a plurality of spatial light modulators to expand the holographic reconstruction viewing angle, but certain gaps exist between the spatial light modulators, which affects the viewing effect of the reconstructed image; Turkish scholars seamlessly spliced nine inclined reflective spatial light modulators together using conical mirrors and beam splitters to obtain a 3D reconstructed image with a viewing angle of 24°; Shanghai University utilizes two spatial light modulators and space-time multiplexing to expand the viewing angle of a color holographic display system. Despite the possibility of increasing the viewing angle of the reconstructed image by using multiple spatial light modulators splicing technique, the system itself is complex and costly, and size of the reconstructed image is also difficult to increase. Y. Sando et al. in Japan proposed a convex parabolic mirror method to enlarge the horizontal viewing angle of a reconstructed image, but the size of the reconstructed image is less than 1 mm. With the development of the display market demand, a breakthrough in holographic true 3D display technology with large viewing angle and large size is urgently demanded.

SUMMARY

This application proposes a holographic true 3D display system and method, based on tunable liquid crystal grating, as shown in FIG. 1, the system comprises a laser, a filter, a beam expander, a semi-transparent semi-reflective mirror, a spatial light modulator, a lens I, a diaphragm, a tunable liquid crystal grating, a polaroid, a signal controller, a lens II and a receiving screen. In the above, the laser, the filter and the beam expander are used for generating collimated incident light. The semi-transparent semi-reflective mirror is positioned between the beam expander and the spatial light modulator, collimated incident light irradiates the spatial light modulator after passing through the semi-transparent semi-reflective mirror, and the spatial light modulator is loaded with a hologram of a 3D object. A diffracted light passes through the lens I after being reflected by the spatial light modulator and the semi-transparent semi-reflective mirror, the diaphragm is positioned behind the lens I and used for eliminating a high-order diffracted light in the holographic true 3D display, and the parameters of the lens I are same to those of the lens II. The tunable liquid crystal grating is located on the back focal plane of the lens I and on the front focal plane of the lens II, and the tunable liquid crystal grating is driven by voltage, wherein the voltage is applied to control a diffraction image to generate a secondary diffraction so as to enlarge the viewing angle and size of the holographic true 3D display system. The signal controller is used for synchronously controlling the voltage of the tunable liquid crystal grating and the generation and loading of the hologram, and after the secondary diffraction image passes through the polaroid and the lens II, a viewer sees the holographic reconstructed image on the receiving screen.

As shown in FIG. 2, the tunable liquid crystal grating comprises an upper glass substrate, an upper electrode, a liquid crystal layer, a lower electrode, an earth electrode and a lower glass substrate, wherein the upper electrode is applied with a direct current $V_{AC}$ and the lower electrode with an alternating current $V_{AC}$, the voltage of the earth electrode is Vo, the width of the lower electrode is $w_1$, the width of the earth electrode is $w_2$ and the width between the lower electrode and the earth electrode is I. When the electrodes are applied with a voltage, an uneven electric field distribution shall be generated between the upper electrode and the lower electrode, inducing liquid crystal molecules to generate a central symmetric distribution of the gradient refractive index, thereby causing deflection of the light rays entering the liquid crystal layer to form a grating effect. The period of the grating is controlled by controlling the magnitude of the direct current applied to the upper electrode, thus achieving the function of adjusting the period of the liquid crystal grating.

The system proposed by this application realizes holographic true 3D display with large viewing angle by following method: using a signal controller to generate the hologram of a 3D object, the resolution of which is the same as that of the spatial light modulator, both being a×b, wherein a indicates the horizontal resolution (lateral resolution) and b indicates the vertical resolution (longitudinal resolution). The size of the diaphragm is adjusted so as to ensure that only diffraction image of one order passes through the tunable liquid crystal grating. In the initial state, no voltage is applied to the tunable liquid crystal grating, where the system's viewing angle is $\theta_0$. When voltage is applied to the tunable liquid crystal grating, the diffraction image is subjected to a secondary diffraction, by adjusting the voltage, after passing through the tunable liquid crystal grating, so that M secondary diffraction images are generated. When the planar light wave vertically irradiates the tunable liquid crystal grating, the complex amplitude Ẽ on the grating surface meets formula (1):

$$\tilde{E}(x) = \begin{cases} 1 + B\cos\dfrac{2\pi}{d}x & x \le \left|\dfrac{Nd}{2}\right| \\ 0 & x \ge \left|\dfrac{Nd}{2}\right| \end{cases} \quad (1)$$

wherein the symmetric center of the tunable liquid crystal grating is taken as an origin, x indicates the transverse displacement from any point on the grating surface to the origin, d indicates the grating pitch, N indicates the grating period number, B indicates the peak transmittance of the tunable liquid crystal grating, and B changes with the voltage change. The diffraction order M of the tunable liquid crystal grating is represented by:

$$M = \frac{d\sin\theta}{\lambda} \quad (2)$$

wherein θ indicates an incident angle of the diffracted light to the tunable liquid crystal grating, 60°≤θ≤90°, λ indicates the wavelength of the incident light. When the diffracted light is vertically incident on the tunable liquid crystal grating, θ=90°. The polarization state of the polaroid is adjusted, so that the secondary diffraction image is uniformly displayed on the receiving screen in intensity after passing through the polaroid and the lens II, and large-viewing-angle holographic true 3D display effect can be achieved on the receiving screen, wherein the viewing angle of the holographic display system is M×θ$_0$.

The system proposed by this application realizes large-size holographic true 3D display by the following method: the resolution of the spatial light modulator is a×b, horizontal resolution of the recorded 3D object is m, a signal controller is used to expand the horizontal resolution of the 3D object to n and generate a hologram of the 3D object, wherein n=m+a and the hologram has a resolution of 2a×b. As shown in FIG. 3, the hologram is equally divided into two sub-holograms, namely sub-hologram I and sub-hologram II, each with a resolution of a×b. At the moment T$_1$, the sub-hologram I is loaded to the spatial light modulator, and no voltage is applied to the tunable liquid crystal grating, at this time since there is no voltage applied to the tunable liquid crystal grating, its function is equivalent to that of transparent glass, and after the diffracted light of the sub-hologram I passes through the tunable liquid crystal grating, the polaroid and the lens II, the reconstructed image of the sub-hologram I is displayed on the receiving screen. At the moment T$_2$ the sub-hologram II is loaded to the spatial light modulator by using the signal controller, meanwhile the tunable liquid crystal grating is applied with a voltage to generate a zero-order primary maximum and ±1 order secondary maximum on the spectral plane, as shown in FIG. 4. The distance L between the zero-order primary maximum and the ±1 order secondary maximum meets formula (3):

$$L = \frac{\lambda f}{d} \quad (3)$$

wherein f indicates the focal length of the lens II. Since the tunable liquid crystal grating is positioned in the back focal plane of the lens I and in the front focal plane of the lens II, with the lens I and lens II forming a 4f system, the spectral plane of the tunable liquid crystal grating coincides thereby with the back focal plane of the 4f system. The transverse displacement and the polarization state of the polaroid are adjusted to filter the zero-order primary maximum and the −1 order secondary maximum out, such that only merely the +1 order secondary maximum is taken into consideration, i.e., the diffraction image of the sub-hologram II will have a transverse translation of L after passing through the tunable liquid crystal grating. The translation amount is set as L, wherein L equalizes the transverse size of the spatial light modulator:

$$L = ap \quad (4)$$

wherein p is the pixel pitch of the spatial light modulator, at this time the reconstructed image of the sub-hologram II can be seen at the +1 order secondary maximum. When the switching time of T$_1$ and T$_2$ is fast enough, a seamless splicing effect, in space, of the sub-hologram I and sub-hologram II is realized according to the visual persistence effect of human eyes, thereby achieving the purpose of enlarging the display size, and under the condition that the reconstruction distance and the viewing angle are not changed, the transverse size of the holographic true 3D display is enlarged to be k times of the original size, and k meets the formula (5):

$$k = \frac{a+m}{m} \quad (5)$$

wherein 0<m≤a.

Preferably, the hologram generation methods of 3D objects in this system are all computational hologram generation methods based on Fresnel diffraction, including a table look-up method, a novel table look-up method, a wavefront phase reconstruction method, an angular spectrum algorithm and the like.

Figure 1:
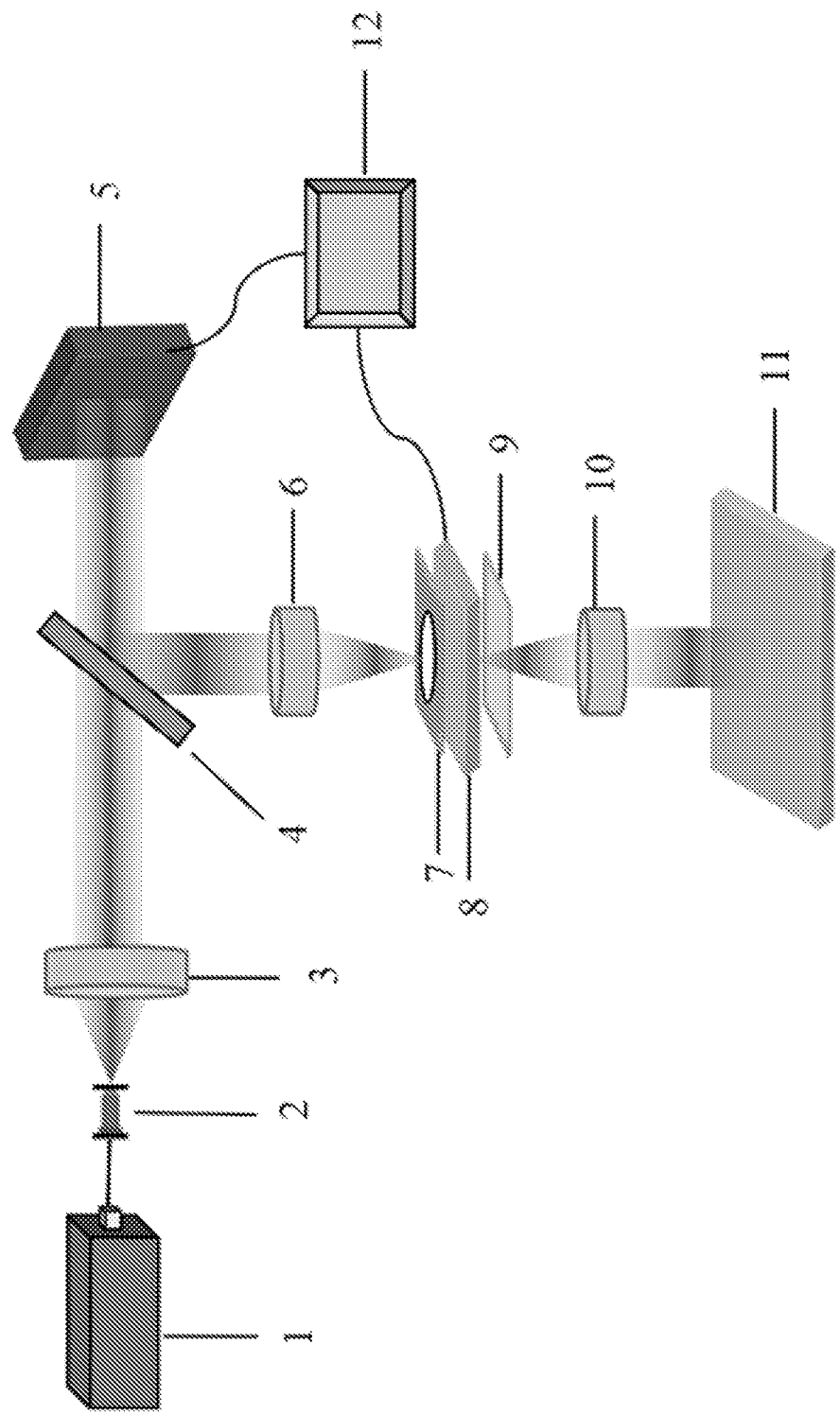
FIG. 1 is a schematic structural diagram of a holographic true 3D display system based on a liquid crystal grating of the present application.
Figure 2:
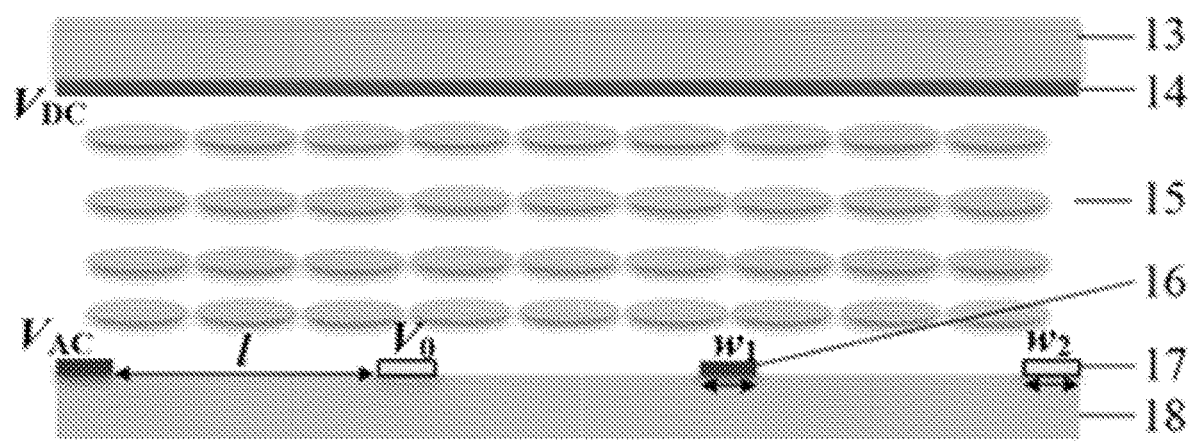
FIG. 2 is a schematic structural diagram of the tunable liquid crystal grating of the present invention application.
Figure 3:
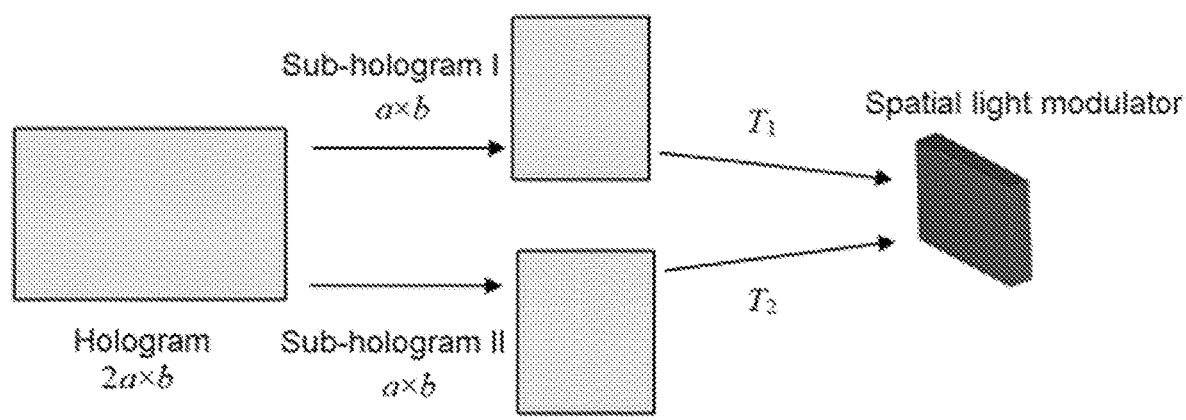
FIG. 3 is a schematic principal diagram of the division of the hologram of the present application.
Figure 4:
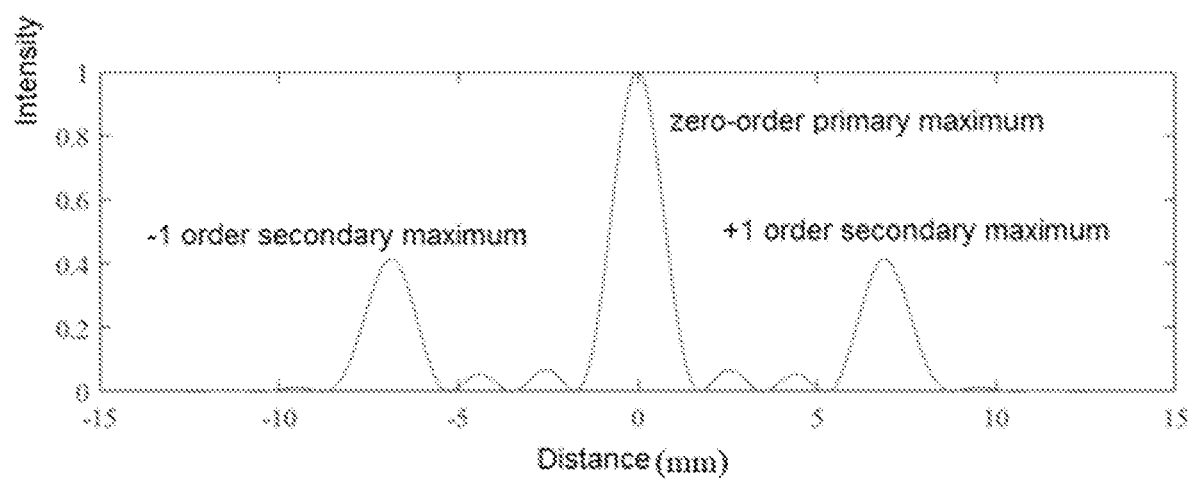
FIG. 4 is a schematic diagram of the spectral distribution of the tunable liquid crystal grating of the present application.

(1) laser, (2) filter, (3) beam expander, (4) semi-transparent semi-reflective mirror, (5) spatial light modulator, (6) lens I, (7) diaphragm, (8) tunable liquid crystal grating, (9) polaroid, (10) lens II, (11) receiving screen, (12) signal controller, (13) upper glass substrate, (14) upper electrode, (15) liquid crystal layer, (16) lower electrode, (17) earth electrode, (18) lower glass substrate.

It should be understood that the above-described figures are merely schematic and are not drawn to scale.

DETAILED DESCRIPTION OF EMBODIMENTS

The following describes embodiments of a tunable liquid crystal grating-based holographic true 3D display system and method proposed in the present application in detail, and further describes the present invention. It should be noted that the following embodiments are only for further illustrative purposes and should not be construed as limiting the scope of the present application, and that the skilled person in the art may make modifications and adaptations of the present invention without departing from the scope of the present application.

The embodiment of the system of the invention is as follows: in the experimental system, the wavelength of the laser is 532 nm, the spatial light modulator is a reflective pure phase spatial light modulator of model FSLM-4K70-P, the pixel pitch of the spatial light modulator is 3.74 μm, the resolution of which is 3840×2060, the refresh rate of which is 60 Hz, and the phase modulation capacity of which is 2π, and the focal lengths of the lens I and the lens II are all 27 cm. The signal controller synchronously controls the generation and loading of the hologram on the spatial light modulator and the voltage of the tunable liquid crystal grating. In the tunable liquid crystal grating, the width $w_1$ of the lower electrode is 2 μm, the width $w_2$ of earth electrode is 2 μm and the width/between the lower electrode and the earth electrode is 8 μm. When the voltage $V_{AC}$ applied to the upper electrode is 4V and the voltage $V_{AC}$ applied to the lower electrode is 8V, the pitch of the tunable liquid crystal grating is 6 μm, and at this time, the incident angle of the diffracted light to the tunable liquid crystal grating is adjusted so that the diffraction order is 10. The period of the grating is changed by controlling the magnitude of the direct current applied to the upper electrode.

In order to realize a holographic true 3D display with large viewing angle, a "camel" with certain depth information is used as the recorded 3D object, of which the resolution is 1400×942 and the reconstruction distance is 15 cm, the signal controller is used to generate the hologram of the 3D object, the resolution of which is 3840×2060, and the size of the diaphragm is adjusted so as to ensure that only diffraction image of one order passes therethrough. In an initial state, the tunable liquid crystal grating is applied with no voltage, at which time the transverse viewing angle of the system is ~3.5°. When voltage is applied to the tunable liquid crystal grating, the diffraction image is subjected to secondary diffraction after passing through the tunable liquid crystal grating, by adjusting the voltage, so that 10 secondary diffraction images are generated, and the polarization state of the polaroid is adjusted, so that the 10 secondary diffraction images are uniformly displayed on the receiving screen in intensity after passing through the polaroid and the lens II, so that the effect of holographic true 3D display with large viewing angle is realized, and the transverse viewing angle is ~35° at the moment.

In order to realize a holographic true 3D display with large viewing angle, a "lotus" with certain depth information is used as the recorded 3D object, of which the resolution is 1422×942 and the reconstruction distance is 15 cm, the signal controller is used to generate the hologram of the 3D object, the resolution of which is 7680×2060, and the hologram is divided into two sub-holograms, i.e., a sub-hologram I and a sub-hologram II, each with a resolution of 3840×2060. At the moment $T_1$ the sub-hologram I is loaded to the spatial light modulator, no voltage is applied to the tunable liquid crystal grating, and the diffracted light of the sub-hologram I is displayed on the receiving screen after passing through the tunable liquid crystal grating, the polaroid and the lens II. At the moment $T_2$ the sub-hologram II is loaded to the spatial light modulator by using the signal controller, meanwhile the tunable liquid crystal grating is applied with a voltage so that the pitch thereof is 10 μm, and that a zero-order primary maximum and ±1 order secondary maximum are generated on the spectral plane, the transverse displacement and the polarization state of the polaroid are adjusted to filter out the zero-order primary maximum and the −1 order secondary maximum and to select the +1 order secondary maximum, the diffraction image of the sub-hologram II is controlled to pass through the tunable liquid crystal grating to have a transverse translation of 14.364 mm. When the switching time of $T_1$ and $T_2$ is fast enough, a seamless splicing effect, in space, of the sub-hologram I and sub-hologram II is realized according to the visual persistence effect of human eyes, thereby achieving the purpose of enlarging the display size. At this time, a large-sized reconstructed image of "lotus" can be seen in the viewing area, and the transverse size of the reconstructed image is enlarged to 3.7 times of the original size.

What is claimed is:

1. A large-viewing-angle holographic true 3D display system, based on a tunable liquid crystal grating, wherein the system comprises a laser, a filter, a beam expander, a semi-transparent semi-reflective mirror, a spatial light modulator, a lens I, a diaphragm, the tunable liquid crystal grating, a polaroid, a signal controller, a lens II and a receiving screen; the laser, the filter and the beam expander are configured for generating collimated incident light; the semi-transparent semi-reflective mirror is positioned between the beam expander and the spatial light modulator, the collimated incident light irradiates the spatial light modulator after passing through the semi-transparent semi-reflective mirror, and the spatial light modulator is loaded with a hologram of a 3D object, a diffracted light passes through the lens I after being reflected by the spatial light modulator and the semi-transparent semi-reflective mirror, the diaphragm is positioned behind the lens I and configured for eliminating a high-order diffracted light in the holographic true 3D display, wherein parameters of the lens I are same to parameters of the lens II; the tunable liquid crystal grating is located on a back focal plane of the lens I and on a front focal plane of the lens II, the tunable liquid crystal grating is driven by a voltage, wherein the voltage is applied to control a diffraction image to generate a secondary diffraction so as to enlarge a viewing angle and a size of the holographic true 3D display system, the signal controller is configured for synchronously controlling the voltage of the tunable liquid crystal grating and generation and loading of the hologram, wherein after a secondary diffraction image passes through the polaroid and the lens II, a viewer sees a holographic reconstructed image on the receiving screen;

wherein the tunable liquid crystal grating comprises an upper glass substrate, an upper electrode, a liquid crystal layer, a lower electrode, an earth electrode and a lower glass substrate, wherein the upper electrode is applied with a direct current and the lower electrode with an alternating current, wherein when the electrodes are applied with a voltage, an uneven electric field distribution is generated between the upper electrode and the lower electrode, inducing liquid crystal molecules to generate a central symmetric distribution of gradient refractive index, thereby causing deflection of light rays entering the liquid crystal layer to form a grating effect, and a period of the grating is controlled by controlling the direct current applied to the upper electrode, thus achieving a function of adjusting the period of the liquid crystal grating;

the system realizes holographic true 3D display with a large viewing angle by following method: using the signal controller to generate the hologram of the 3D object, with a resolution of the hologram being same as that of the spatial light modulator, both being a×b, wherein a indicates a horizontal resolution, b indicates a vertical resolution, and a size of the diaphragm is adjusted so as to ensure that only diffraction image of one order passes through the tunable liquid crystal grating; in an initial state, no voltage is applied to the tunable liquid crystal grating, where the viewing angle of the system is $\theta_0$; when the voltage is applied to the tunable liquid crystal grating, the diffraction image is subjected to a secondary diffraction, by adjusting the voltage, after passing through the tunable liquid crystal grating, so that M secondary diffraction images are generated, and when a planar light wave vertically irradiates the tunable liquid crystal grating, a complex amplitude $\tilde{E}$ on a grating surface meets formula:

$$\tilde{E}(x) = \begin{cases} 1 + B \cos\frac{2\pi}{d}x & x \le \left|\frac{Nd}{2}\right| \\ 0 & x \ge \left|\frac{Nd}{2}\right| \end{cases}$$

wherein a symmetric center of the tunable liquid crystal grating is taken as an origin, x indicates a transverse displacement from any point on the grating surface to the origin, d indicates a grating pitch, N indicates a grating period number, B indicates a peak transmittance of the tunable liquid crystal grating and changes with voltage change; a diffraction order M of the tunable liquid crystal grating is represented by:

$$M = \frac{d \sin \theta}{\lambda}$$

wherein $\theta$ indicates an incident angle of the diffracted light to the tunable liquid crystal grating, $60° \le \theta \le 90°$, $\lambda$ indicates a wavelength of the incident light, wherein when the diffracted light is vertically incident on the tunable liquid crystal grating, $\theta = 9°$; a polarization state of the polaroid is adjusted, so that the secondary diffraction image is uniformly displayed on the receiving screen in intensity after passing through the polaroid and the lens II, and large-viewing-angle holographic true 3D display effect can be obtained on the receiving screen, wherein the viewing angle of the holographic display system is $M \times \theta_0$;

the system realizes large-size holographic true 3D display by the following method: a resolution of the spatial light modulator is a×b, a horizontal resolution of the recorded 3D object is m, the signal controller is used to expand the horizontal resolution of the 3D object to n and generate the hologram of the 3D object, wherein n=m+a and the hologram has a resolution of 2a×b, the hologram is equally divided into two sub-holograms, namely sub-hologram I and sub-hologram II, each with a resolution of a×b; at a moment $T_1$ the sub-hologram I is loaded to the spatial light modulator, and no voltage is applied to the tunable liquid crystal grating, at this time since there is no voltage applied to the tunable liquid crystal grating, its function is equivalent to that of transparent glass, and after the diffracted light of the sub-hologram I passes through the tunable liquid crystal grating, the polaroid and the lens II, the reconstructed image is displayed on the receiving screen; at the moment $T_2$ the sub-hologram II is loaded to the spatial light modulator by using the signal controller, meanwhile the tunable liquid crystal grating is applied with a voltage to generate a zero-order primary maximum and ±1 order secondary maximum on the spectral plane, wherein a distance L between the zero-order primary maximum and the ±1 order secondary maximum meets formula:

$$L = \frac{\lambda f}{d}$$

wherein f indicates a focal length of the lens II, wherein since the tunable liquid crystal grating is positioned in the back focal plane of the lens I and in the front focal plane of the lens II, the lens I and lens II thereby form a 4f system, the spectral plane of the tunable liquid crystal grating is located in the back focal plane of the 4f system, the transverse displacement and the polarization state of the polaroid are adjusted to filter out the zero-order primary maximum and the −1 order secondary maximum out and only +1 order secondary maximum is taken into consideration, i.e., the diffraction image of the sub-hologram II has a transverse translation of L after passing through the tunable liquid crystal grating, with translation amount set as L, wherein L equalizes a transverse size of the spatial light modulator:

$$L = ap$$

wherein p indicates a pixel pitch of the spatial light modulator, at which time the reconstructed image of the sub-hologram II can be seen at the +1 order secondary maximum; when switching time of $T_1$ and $T_2$ is fast enough, a seamless splicing effect, in space, of the sub-hologram I and sub-hologram II is realized according to a visual persistence effect of human eyes, thereby achieving a purpose of enlarging a display size, and in a case that a reconstruction distance is not changed, the size of the holographic true 3D display is enlarged to be k times of an original size, and k meets the formula:

$$k = \frac{a+m}{m}$$

wherein $0 < m \le a$.

2. A large-viewing-angle holographic true 3D display method, based on a tunable liquid crystal grating, wherein a system comprises a laser, a filter, a beam expander, a semi-transparent semi-reflective mirror, a spatial light modulator, a lens I, a diaphragm, the tunable liquid crystal grating, a polaroid, a signal controller, a lens II and a receiving screen; the laser, the filter and the beam expander are configured for generating collimated incident light; the semi-transparent semi-reflective mirror is positioned between the beam expander and the spatial light modulator, the collimated incident light irradiates the spatial light modulator after passing through the semi-transparent semi-reflective mirror, and the spatial light modulator is loaded with a hologram of a 3D object, a diffracted light passes through the lens I after being reflected by the spatial light modulator and the semi-transparent semi-reflective mirror, the diaphragm is positioned behind the lens I and configured for eliminating a high-order diffracted light in the holographic true 3D display, wherein parameters of the lens I are same to parameters of the lens II; the tunable liquid crystal grating is located on a back focal plane of the lens I and on a front focal plane of the lens II, the tunable liquid crystal grating is driven by a voltage, wherein the voltage is applied to control a diffraction image to generate a secondary diffraction so as to enlarge a viewing angle and a size of the holographic true 3D display system, the signal controller is configured for synchronously controlling the voltage of the tunable liquid crystal grating and generation and loading of the hologram, wherein after a secondary diffraction image passes through the polaroid and the lens II, a viewer sees a holographic reconstructed image on the receiving screen;

wherein the tunable liquid crystal grating comprises an upper glass substrate, an upper electrode, a liquid crystal layer, a lower electrode, an earth electrode and a lower glass substrate, wherein the upper electrode is applied with a direct current and the lower electrode with an alternating current, wherein when the electrodes are applied with a voltage, an uneven electric field distribution is generated between the upper electrode and the lower electrode, inducing liquid crystal molecules to generate a central symmetric distribution of gradient refractive index, thereby causing deflection of light rays entering the liquid crystal layer to form a grating effect, and a period of the grating is controlled by controlling the direct current applied to the upper electrode, thus achieving a function of adjusting the period of the liquid crystal grating;

the system realizes holographic true 3D display with a large viewing angle by following method: using the signal controller to generate the hologram of the 3D object, with a resolution of the hologram being same as that of the spatial light modulator, both being a×b, wherein a indicates a horizontal resolution, b indicates a vertical resolution, and a size of the diaphragm is adjusted so as to ensure that only diffraction image of one order passes through the tunable liquid crystal grating; in an initial state, no voltage is applied to the tunable liquid crystal grating, where the viewing angle of the system is $\theta_0$; when the voltage is applied to the tunable liquid crystal grating, the diffraction image is subjected to a secondary diffraction, by adjusting the voltage, after passing through the tunable liquid crystal grating, so that M secondary diffraction images are generated, and when a planar light wave vertically irradiates the tunable liquid crystal grating, a complex amplitude $\tilde{E}$ on a grating surface meets formula:

$$\tilde{E}(x) = \begin{cases} 1 + B\cos\dfrac{2\pi}{d}x & x \le \left|\dfrac{Nd}{2}\right| \\ 0 & x \ge \left|\dfrac{Nd}{2}\right| \end{cases}$$

wherein a symmetric center of the tunable liquid crystal grating is taken as an origin, x indicates a transverse displacement from any point on the grating surface to the origin, d indicates a grating pitch, N indicates a grating period number, B indicates a peak transmittance of the tunable liquid crystal grating and changes with voltage change; a diffraction order M of the tunable liquid crystal grating is represented by:

$$M = \frac{d\sin\theta}{\lambda}$$

wherein $\theta$ indicates an incident angle of the diffracted light to the tunable liquid crystal grating, $60°\le\theta\le90°$, $\lambda$ indicates a wavelength of the incident light, wherein when the diffracted light is vertically incident on the tunable liquid crystal grating, $\theta=90$; a polarization state of the polaroid is adjusted, so that the secondary diffraction image is uniformly displayed on the receiving screen in intensity after passing through the polaroid and the lens II, and large-viewing-angle holographic true 3D display effect can be obtained on the receiving screen, wherein the viewing angle of the holographic display system is $M\times\theta_0$;

the system realizes large-size holographic true 3D display by the following method: a resolution of the spatial light modulator is a×b, a horizontal resolution of the recorded 3D object is m, the signal controller is used to expand the horizontal resolution of the 3D object to n and generate the hologram of the 3D object, wherein n=m+a and the hologram has a resolution of 2a×b, the hologram is equally divided into two sub-holograms, namely sub-hologram I and sub-hologram II, each with a resolution of a×b; at a moment $T_1$ the sub-hologram I is loaded to the spatial light modulator, and no voltage is applied to the tunable liquid crystal grating, at this time since there is no voltage applied to the tunable liquid crystal grating, its function is equivalent to that of transparent glass, and after the diffracted light of the sub-hologram I passes through the tunable liquid crystal grating, the polaroid and the lens II, the reconstructed image is displayed on the receiving screen; at the moment $T_2$ the sub-hologram II is loaded to the spatial light modulator by using the signal controller, meanwhile the tunable liquid crystal grating is applied with a voltage to generate a zero-order primary maximum and ±1 order secondary maximum on the spectral plane, wherein a distance L between the zero-order primary maximum and the ±1 order secondary maximum meets formula:

$$L = \frac{\lambda f}{d}$$

wherein f indicates a focal length of the lens II, wherein since the tunable liquid crystal grating is positioned in the back focal plane of the lens I and in the front focal plane of the lens II, the lens I and lens II thereby form a 4f system, the spectral plane of the tunable liquid crystal grating is located in the back focal plane of the 4f system, the transverse displacement and the polarization state of the polaroid are adjusted to filter out the zero-order primary maximum and the −1 order secondary maximum out and only +1 order secondary maximum is taken into consideration, i.e., the diffraction image of the sub-hologram II has a transverse translation of L after passing through the tunable liquid crystal grating, with translation amount set as L, wherein L equalizes a transverse size of the spatial light modulator:

$$L = ap$$

wherein p indicates a pixel pitch of the spatial light modulator, at which time the reconstructed image of the sub-hologram II can be seen at the +1 order secondary maximum; when switching time of $T_1$ and $T_2$ is fast enough, a seamless splicing effect, in space, of the sub-hologram I and sub-hologram II is realized according to a visual persistence effect of human eyes, thereby achieving a purpose of enlarging a display size, and in a case that a reconstruction distance is not changed, the size of the holographic true 3D display is enlarged to be k times of an original size, and k meets the formula:

$$k = \frac{a+m}{m}$$

wherein $0 < m \leq a$.

* * * * *